US007090917B2

(12) United States Patent
Puttkammer

(10) Patent No.: US 7,090,917 B2
(45) Date of Patent: Aug. 15, 2006

(54) SECURITY STRIPS

(75) Inventor: Frank Puttkammer, Coswig (DE)

(73) Assignee: WHD elektronische Prueftechnik GmbH, Dresden (DE)

( * ) Notice: Subject to any disclaimer, the term of this patent is extended or adjusted under 35 U.S.C. 154(b) by 0 days.

(21) Appl. No.: 10/469,652

(22) PCT Filed: Feb. 28, 2002

(86) PCT No.: PCT/DE02/00749

§ 371 (c)(1),
(2), (4) Date: Sep. 2, 2003

(87) PCT Pub. No.: WO02/071345

PCT Pub. Date: Sep. 12, 2002

(65) Prior Publication Data

US 2004/0096648 A1 May 20, 2004

(30) Foreign Application Priority Data

Mar. 1, 2001 (DE) ................................ 101 11 848

(51) Int. Cl.
*B32B 5/16* (2006.01)

(52) U.S. Cl. ...................... 428/323; 428/137; 428/916; 283/72; 283/74; 283/85; 283/86

(58) Field of Classification Search ................ 428/137, 428/916, 323; 283/74, 81, 82, 83
See application file for complete search history.

(56) References Cited

U.S. PATENT DOCUMENTS

| | | | | |
|---|---|---|---|---|
| 4,290,630 | A * | 9/1981 | Lee | 283/82 |
| 4,579,371 | A * | 4/1986 | Long et al. | 283/83 |
| 4,609,207 | A * | 9/1986 | Muck et al. | 283/70 |
| 5,176,405 | A * | 1/1993 | Kaule et al. | 283/83 |
| 5,639,126 | A * | 6/1997 | Dames et al. | 283/83 |
| 2002/0113430 | A1* | 8/2002 | Beghello et al. | 283/83 |
| 2003/0164611 | A1* | 9/2003 | Schneider et al. | 283/57 |
| 2004/0101664 | A1* | 5/2004 | Puttkammer | 428/209 |
| 2004/0105957 | A1* | 6/2004 | Puttkammer | 428/137 |

* cited by examiner

*Primary Examiner*—Rena Dye
*Assistant Examiner*—Camie S. Thompson
(74) *Attorney, Agent, or Firm*—Neifeld IP Law, PC

(57) ABSTRACT

Security strips for identifying the genuineness of sheet material such as documents, securities and banknotes. The security strips are constructed of several different components, encoding means and electrically conductive layers connected in different arrangements on a support substrate. Layers of known per se electrically conductive polymers are being used. The security strips are applied on the sheet material or they are integrated in the sheet material. These security strips constitute insurmountable technological obstacles for a forger.

19 Claims, 3 Drawing Sheets

SECURITY STRIPS

BACKGROUND OF THE INVENTION

1. Field of the Invention

Figure 1A:
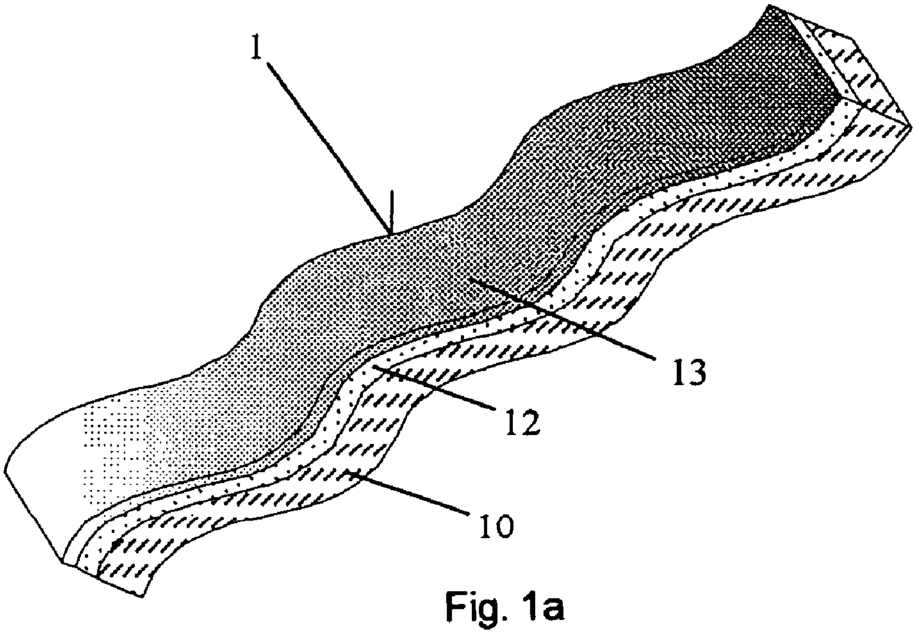

The invention relates to security strips for the identification of genuineness of web materials such as documents, securities and banknotes.

2. The Prior Art

In connection with the ever improving quality of state-of-the-art copying and computer technology, an increase in the number of imitation of documents, securities and banknotes is to be expected. For instance, banknotes forged with the aid of modern copying machines cannot by human vision be distinguished easily from genuine banknotes. Hence, measures must be taken which for some time cannot be overcome by technologies available to counterfeiters. Aside from special paper for such securities banknotes are, for instance, provided with refractively active security elements and a security thread embedded in the paper.

Testing of refractively active security elements cannot be performed easily within a document processing machine as it is operated at high speeds. Testing is carried out visually during production of the banknotes as well as by sorting, as may become necessary, of banknotes returning from circulation. Such processes are time consuming and expensive.

Paper-embedded security threads usually of foil structure consisting of at least one support substrate and a metalization applied to the support substrate and which are embedded in the paper web either complete or with so-called windows (window thread), are usually examined for their electric conductivity by firmly established inductive and capacitive coupling methods. The examination of the electrical conductivity of the metalization is made complex because on the one hand banknotes when in use are subject to very high wear and tear as, for instance, by creasing and folding by the user, but also by bending in automatic teller machines and tallying machines. On the other hand, the foil structure is subjected to considerable stresses during the technological paper making process because of stretching and bending in a rotary screen. Consequently, randomly distributed fine fissures occur in the metalization which render measuring results unsafe and not reproducible. In order to counter forgeries of this security element, it is not only the presence of the metalization which must be detected in banking machines, but the genuineness must also be defined by a predetermined parameter of the conductivity.

DE 22 15 628 describes a metalization thread or strip with machine readable individualizing codes structured as a perforated security strip or as a strip provided with magnetic data.

A security document, in particular a banknote with a security element provided with indicia readable in penetrating light and which is electrically conductive, and which is provided with further materials for mechanized testing, has been described in DE 40 41 025 A1. Preferably, the security element consists of a transparent strip of foil provided with negative writing which may easily be visually tested and which is additionally provided with electrically conductive and magnetic materials.

The known testing elements for authenticity tests of objects, securities, especially banknotes, suffer from the main disadvantage which resides in their being known. This being known is such as to enable a forger to arrive at conclusions in respect of the elements to be tested, on the basis of knowing the testing methods and devices and their functioning.

In DE 197 18 859 there has been described a method of applying a conductive layer on a plastic foil. In this connection, a primer is initially deposited on the printable foil, and, subsequently, a conductive organic polymer.

Furthermore, DE 198 36 503 describes a method of integrating electrically conductive materials into the paper web of documents with an electrically conductive security thread, with an electrically conductive polymer being homogeneously or sectionally applied onto or into the paper web.

DE 198 56 457 describes a foil for a foil capacitor in which, for reducing the total resistance of the electrode, current paths are formed on the electrically conductive layer which have a lower surface resistance than the electrically conductive layer. The electrically conductive layer may be either a metallic layer or a conductive polymer layer. The current paths consist of the same or of another electrically conductive material.

Moreover, DE 199 15 155 describes an electrically conductive material for security elements to be embedded in paper webs for the testing of documents, the material being an electrically conductive polymer. The security element is a foil structure of at least one support foil, an applied metalization with sectional demetalizations and a layer of the electrically conductive polymer. Fractures in the metalization are bridged be the parallel layer of electrically conductive polymer.

Finally, DE 199 28 060 describes an optically variable security element with at least one support foil, a reflective layer, diffractive structures and a protective layer for the testing of documents, there being embedded in the laminar structure, at varying positions, of the security element an electrically conductive polymer which is applied to a support material as a liquid coating material as a solution, dispersion or suspension, or as a monomer, together with a polymerizer, the reflective layer consisting of at least one layer of lacquer containing film-like metal pigments.

DE 199 35 434 describes a method of current-free precipitation of metallic layers of high metallic conductivity with a slurry being applied to a substrate which contains at least one organic binder, a reduction agent and at least one solvent. The solvent is subsequently removed from the layer, and the layer is brought into contact with a solution which contains ions of the metal to be precipitated.

Finally, WO94/19813 describes a metalized foil capacitor wherein the metalization of the foils is as thin as possible in order to improve the dielectric stability. This results in conductivities of from 5–300Ω/□. The invention is based, among others, on the use of metal layers of different thicknesses which are being realized separately.

OBJECTS OF THE INVENTION

In addition to overcoming the disadvantages of the prior art, it is an object of the invention to propose security strips for identifying the genuineness of sheet material like documents, securities and banknotes. The selective combination of metalized surfaces, surface brilliancy, electrically conductive surfaces and changes in surface resistances which is only known to its manufacturer or authorized control agency constitutes an insurmountable technological obstacle for a forger.

SUMMARY OF THE INVENTION

Before describing the invention, terms will hereafter be defined as they are persistently understood even in the patent claims. Integral metalizationvwill be understood to be a homogeneously metalized surface of homogeneous surface brilliancy. Scattered metalization will be understood to be a non-homogeneous metalized surface or as a homogeneously metalized surface including demetalizations or a homogeneously metalized surface of non-homogeneous surface brilliancy or a homogeneously metalized surface of non-homogeneous surface brilliancy and demetalizations. Substrate or support substrate will connote any material unto or into which encoding means are to be applied, the material being, for instance, plastic or metal foil, paper, card board and textile webs. Encoding means will hereinafter and in the claims be understood to refer to means for securing and encoding, with electrical, optical or magnetic functionalities. Hereinafter, security ribbon will collectively connote the most variegated security ribbons, strips, threads and security foils and the like which are wholly or partially visible on or in the web material by being looked at and/or looked through. Sheet material is intended to connote all security documents or papers for documents, securities and banknotes.

The security strips in accordance with the invention are constructed of several different components, encoding means and electrically conductive layers, they being connected to a support substrate in various arrangements. Layers of electrically conductive polymers which are known per se will be used. These security strips are applied to or integrated in sheet material. The use of layers of electrically conductive polymers in combination with a metalizing layer is predicated on a marked difference between their surface resistances (≈100 kΩ/□), a very high electrical surface resistance being demanded of the metalizing layer (≈200 kΩ/□). Conventional and used metalization technologies yield low surface resistances.

It is the coating with an electrically conductive polymer, e.g. polyethylene dioxythiophene polystyrene sulfonate (PEDT/PSS) in combination with a metalization layer which is to be used in particular as an obstacle for forgers. PEDT/PSS is characterized by a surface resistance in the range of from 15–100 kΩ/□. Using a primer, a surface resistance of 50 kΩ/□ is achieved on PE foils. The polymer layer is applied over the entire surface or in sections; preferably it is applied in a surface-modulating manner or by scattered printing. As a result of the sectionally changing surface resistance a readable code is created. This may easily be detected by various means, especially by capacitive coupling. A possible automatic dual test of physical aspects of the electrically conductive polymer PEDT/PSS is of advantage which on the one hand detects the electrical conductivity and, on the other hand, the optical properties in the IR range, for instance. At increasing wavelength (>900 nm) as well as weight of application or layer thickness the IR properties may be used effectively. Absorption and changes in wave length provide measurable parameters. The dual test reduces the probability of identifying forgeries, i.e. the error rate of unrecognized forgeries as well as the error rate of genuine products recognized as forgeries.

A metalized surface to be used in accordance with the invention, especially one of high brilliancy, of which it would be assumed that it possesses good electrical conductivity and which might include an electrically conductive security feature or which itself constitutes a security feature because of encoded changes in surface resistance, constitutes a further obstacle for a forger, since purpose, function and functionality of the metalized surface can neither be assumed nor are they obvious.

In particular, the invention relates to security strips for identifying the genuineness of sheet materials such as, for instance, documents, securities and banknotes. The security strips consist of substrates, integral or scattered metalized layers of defined surface resistance and of electrically conductive polymers, also of defined surface resistance. In accordance with the invention, the surface resistance of the integral or scattered metalized layers is greater than 200 kΩ/□, and the surface resistance of electrically conductive polymers lies in the range of from 15–100 kΩ/□. This kind of inventive security strips is connected in a manner known per se to sheet material for instance security documents and banknotes.

The construction of the security strips, i.e. the arrangement of substrates, electrically conductive polymers, integral or scattered metalized layers, protective layers, release agents and/or adhesive layers, is selected in accordance with their intended use, whereby the individual layers are interchangeable. The use of siliconized layers as well as transfer ribbons or layers as release agents is preferred. Depending on intended use and used manufacturing technology, primers are used, the primers serving as bonding agents, and in accordance with the invention they are also suitable for smoothing coated substrates. The electrically conductive polymers, the integral or scattered metalized layers, the substrates, as well as the possibly required protective layers and primers are arranged as encoding means in accordance with the invention such that their electrical or optical or magnetic functionalities are used as encoding means, the electrical functionalities being detectable by capacitive coupling.

In accordance with the invention the electrically conductive polymers are sectionally or surface-modulatingly or sectionally surface-modulatingly applied. In this case, too, a resultant code may be capacitively detected. Sectionally or surface-modulated or sectionally surface-modulated applied integral or scattered metalized layers are also detectable by capacitive coupling.

In accordance with the invention, the encoding means of the security strips may be physically affected. In particular, by applying energy such as visible light, UV, IR or heat radiation the encoding means will react in a manner discernible by a testing person as a mark of genuineness or originality, either in the security strips or in conjunction with a security document or banknote. The electrically conductive polymer to be used in accordance with the invention preferably is a polyethylene dioxythiophene polystyrene sulfate (PEDT/PSS).

In a special embodiment of the invention partial strips are joined to a security strip. The individual partial strips may, as has already been described, consist of substrates, integral or scattered metalized layers and electrically conductive polymers, and the individual partial strips may also consist of protective layers, release agent layers, adhesive layers and a primer. The selection and arrangement of the individual layers depends upon the desired use and processing technology. Different surface resistances of individual layers in the partial strips also lie within the ambit of the invention. The partial strips made of identical or of different construction by themselves or after having been joined to a security strip result in codes. All encoding means on the partial strips and on the security strip may be aligned in different ways on the surface on which they are applied.

DESCRIPTION OF THE SEVERAL DRAWINGS

Figure 1B:
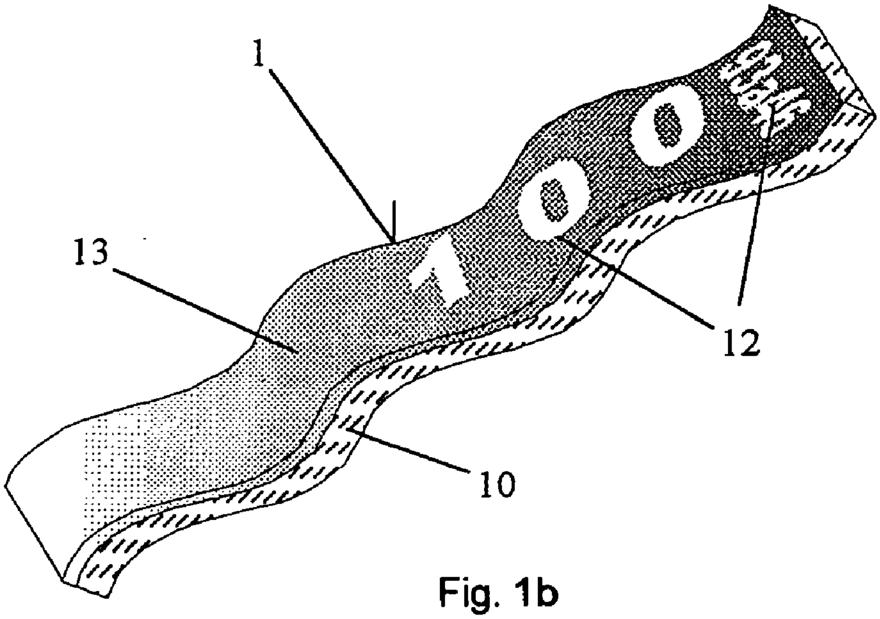
Figure 2A:
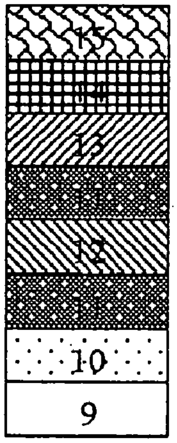
Figure 2B:
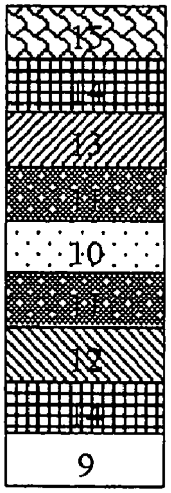
Figure 2C:
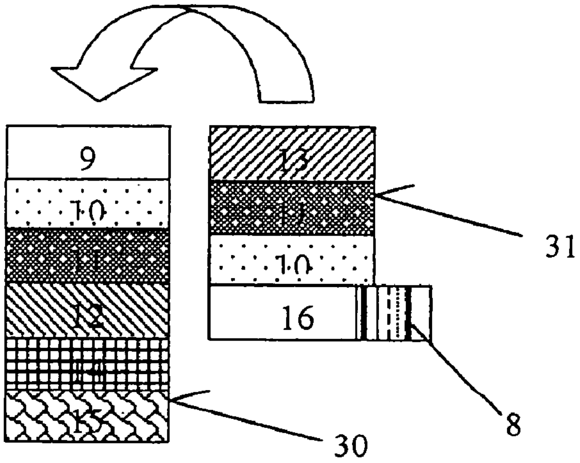
Figure 4:
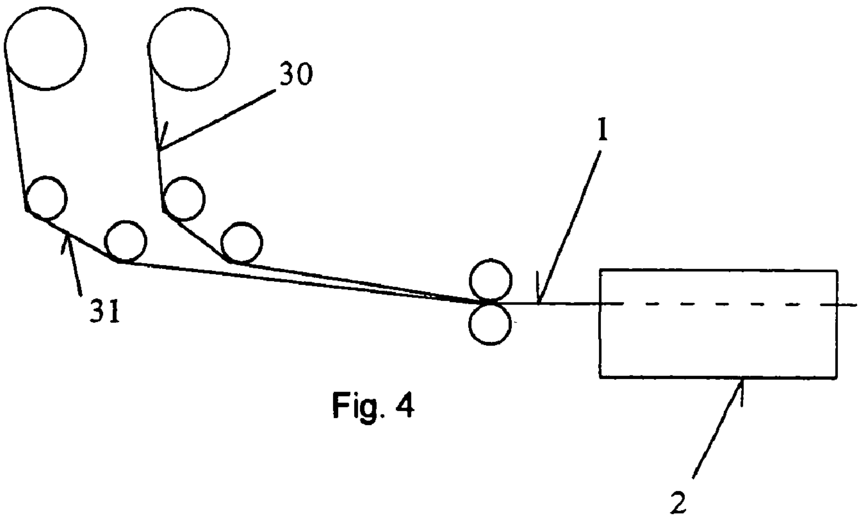
Figure 3A:
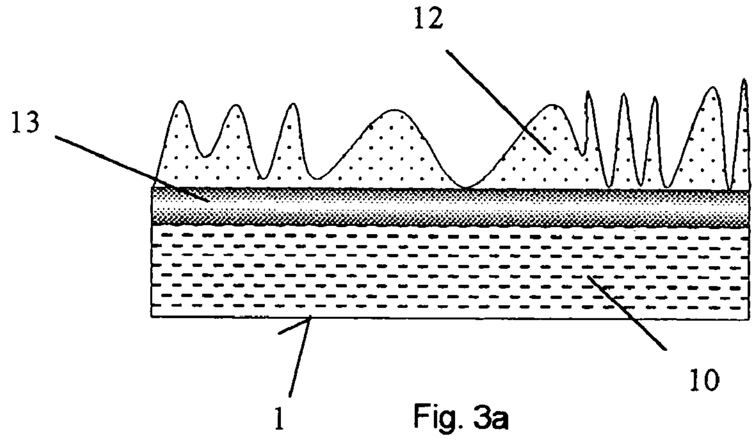
Figure 3B:
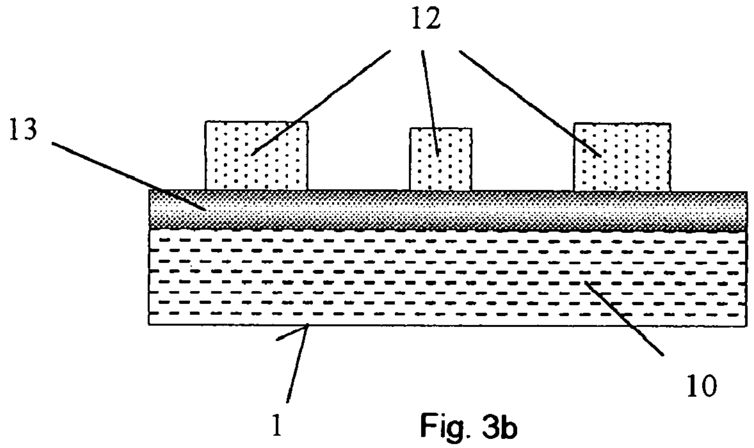
Figure 3C:
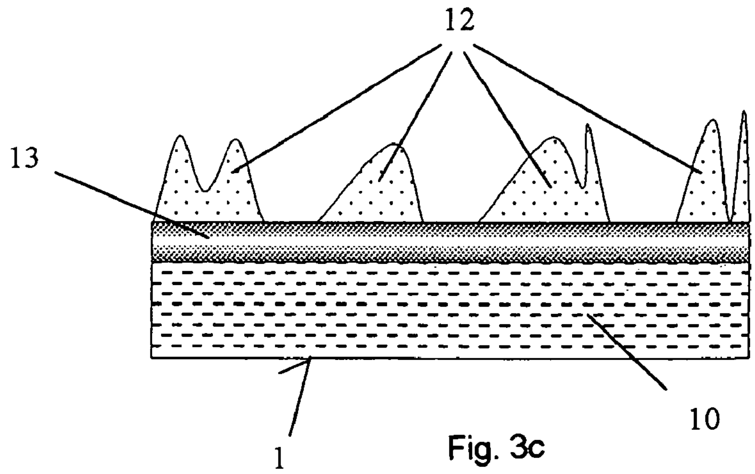

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

FIG. 1*a* is a schematic partial view of a security strip;

FIG. 1*b* is a schematic view of a security strip with a code;

FIGS. 2*a*–2*c* schematically depict the layer structure of different variants of security strips;

FIGS. 3*a*–3*c* depict further variants of a schematically shown layer structure of security strips;

FIG. 4 is a schematic representation of a two-component security strip.

DETAILED DESCRIPTION OF THE PREFERRED EMBODIMENTS

Example 1

FIG. 1 schematically depicts a portion of a security strip 1 in accordance with the invention for identifying the genuineness of sheet material 2. In essence it contains a substrate 10, an integral or scattered metalized application or application layer 13 and an electrically conductive polymer 12 having a surface resistance in the order of from 15–100 kΩ/□, the difference between the surface resistance of the integral or scattered metalized application and the surface resistance of the electrically conductive polymer being greater than 100 kΩ/□. The layers may be selectively interchanged. As a variant of the embodiment described, FIG. 1*b* depicts a partial piece of a security strip 1 consisting of a substrate 10 and an integral metalized application 13 having a surface resistance greater than 200 kΩ/□. The invisible, to humans, electrically conductive polymer 12 (graphically emphasized in FIG. 1*b*)—in this case a polyethylene dioxythiophene polystyrene sulfonate (PEDT/PSS)—is shown to identify the denomination of a banknote and a series number. The PEDT/PSS is applied, by use of a primer, to the metalized layer 13 in a manner known per se.

Example 2

FIG. 2*a* depicts a further variant of the security strip 1 in accordance with the invention. A substrate 10 has been smoothed by a primer 11. The electrically conductive polymer 12 is positioned thereon and, if necessary, is also provided with a primer 11. This is followed by the metalized layer 13 and, if desired by the intended use, a final protective layer 14. A primer 11 may also be necessary between the metalized layer 13 and the protective layer 14. A colored lacquer (not shown in FIG. 2*a*) may be applied to the protective layer 14 for optical refinement. It is conceivable to interchange the electrically conductive layer 12 and the metalized layer 13. The used primers 11 may act as bonding agents. The security strip 1 additionally contains an adhesive layer 15 for connecting or integrating with the sheet material 2. Where the security strip 1 is pressed into or sealed to with the sheet material, there will be no need for the adhesive layer 15. Since the security strip is usually coiled on reels it would be reasonable to provide one of its surfaces with a release agent 9, especially a silicon film. The release agent 9 of the security strip 1 may also be a transfer ribbon 16 (FIG. 2*c*), the transfer ribbon 16 being provided with alignment means 8, for instance, perforations, magnetic tracks or optical markings for applying the security strip 1 to the sheet material 2 in a precise position. Of the exemplary embodiments, the substrate 10 in the present embodiment is coated on both sides; at one side of the substrate 10 there is provided the electrically conductive polymer 12, and on the other side there is provided the metalized layer 13.

Example 3

A further variant is shown in FIG. 2*c*. Two partial strips 30, 31 manufactured independently of each other are connected to each other. The partial strips 30, 31 may, for instance, be glued or pressed or sealed to each other and when joined, they form the security strip 1. One the partial strips 30, in addition to other layers, consists of a substrate 10 and the electrically conductive polymer 12, and the other partial strip 31 in essence consists of a substrate 10 and the metalized layer 13. Depending upon their intended future use and technological possibilities the essential layers of the partial strips 30, 31 are interchangeable, and the partial strips 30, 31 may be joined at different positions.

Example 4

In a further embodiment of the security strip 1 or the partial strips 30, 31 the electrically conductive layer 12 is applied so as to modulate the surface. FIG. 3*a* schematically depicts the structure of a partial component of a security strip 1. The different application thicknesses and the changing surface resistances resulting therefrom create a code. In this embodiment the modulated surface resistances represent a specific code of the sheet material 2.

Example 5

This example describes a security strip 1 or partial strips 30, 31 similar to the one described in Example 4, with the electrically conductive polymer 12 being applied sectionally. As shown in FIG. 3*b*, the sectional applications of polymer 12 result in sectionally changing surface resistances which, in turn, serve as codes and which may represent charge and serial numbers.

Example 6

As a variation of Examples 4 and 5, a further embodiment of the security strip 1 or partial strips 30, 31 is presented with reference to FIG. 3*c*. The electrically conductive polymer 12 is applied sectionally and the given sections of the layer are applied in a manner modulating the surface. The sectionally changing surface resistance results in a code representing the manufacturer and manufacturing date, and the surface-modulated sections result in a code representing specifics of the sheet material 2.

Example 7

This embodiment proposes one or more combined codes according to Examples 4, 5 and/or 6, the code being realized in different surface directions. For instance, the electrically conductive polymer 12 is applied in one surface direction in a sectional surface-modulating manner (see Example 5) and, in another surface direction, it is applied sectionally (see Example 5) with different codes resulting in the two directions.

Example 8

In a further embodiment of the security strip 1 or of the partial strips 30, 31, a primer 11 is applied sectionally or surface-modulatingly or sectionally surface-modulatingly in the manner of the electrically conductive polymer 12 in Examples 4 to 7. The resultant structure of the primer application 11 transfers as a master structure to the layer of electrically conductive polymer 12 to be applied and/or to a metalized layer 13. Codes of the kind describes in Examples 4 to 7 will result.

Example 9

Two manufacturers of thread components manufacture components of a security strip 1. The partial strips 30, 31 are connected to each other by conventional transfer methods (shown in FIG. 4) and represent codes either by themselves or as a result of their being combined. Advantageously the partial strips 30, 31 or the combination of the partial strips 30, 31 should be compatible with conventional systems. As has been mentioned supra, each partial strip 30, 31 by itself and as a combination of the partial strips 30, 31 should represent a code. The combination of two partial strips 30, 31 results in a coded security strip 1. Only the precise interfitting of the two partial strips 30, 31 will result in the desired code which represents the genuineness of the sheet material 2. The individual encoding means may have different functionalities such as, preferably, electrical, magnetic or optical ones. In accordance with the invention, individual partial strips 30, 31 may also be provided with encoding means which may be physically affected, for instance by the application of energy such as, especially, visible light, UV, IR or heat radiation.

Example 10

Using the variants described in the preceding Examples, a code is activated only by uniting or integrating the security strips 1 with the sheet material 2. Combining the security strip 1 with indicia of the sheet material 2 leads to a decodable or detectable code.

In addition to the embodiment here presented, the characteristics of the invention will be apparent from the claims and drawings. The characteristics by themselves or as a subcombination of several individual elements represent advantageous protectible embodiments for which protection is claimed hereby.

The invention claimed is:

1. A security strip (1) for identifying the genuineness of sheet material (2), comprising a substrate (10), an integral or scattered metalized layer (13) of a predetermined first surface resistance, a sectionally or surface-modulatingly applied electrically conductive polymer (12) of a predetermined second surface resistance; the difference between the first and second surface resistance being greater than 10 kΩ/□; and at least one of a selective protective layer (14), release agent (9), substrate-smoothing primer (11) and adhesive layer (15); the security strip (1) being integrated into sheet material (2).

2. The security strip of claim 1, wherein the surface resistance of the integral or scattered metalized layer (13) is greater than 200 kΩ/□.

3. The security strip of claim 1, wherein the surface resistance of the electrically conductive polymer (12) lies in the range of from 15–100 kΩ/□.

4. The security strip of claim 1, wherein the release agent (9) comprises one of a siliconized layer or a transfer ribbon (16) and, for alignment, is provided with at least one of perforations, magnetic tracks, and optical markings.

5. The security strip of claim 4, wherein the sectionally or surface-modulatingly applied electrically conductive polymer (12), the integral or scattered metalized layer (13), the substrate (10), the protective layer (14) and the primer (11) are selectively arranged as encoding means.

6. The security strip of claim 5, wherein the encoding means are provided with electrical and/or optical and/or magnetic functionalities.

7. The security strip of claim 6, wherein the surface resistance of the partially or surface-modulatingly applied electrically conductive polymers (12) is a readable code, detectable by capacitive coupling.

8. The security strip of claim 7, wherein the integral or scattered metalized applications (13) are applied sectionally or surface-modulatingly or sectionally surface-modulatingly.

9. The security strip of claim 8, wherein the surface resistance of the integral or scattered metalized applications (13) is a readable code, detectable especially by capacitive coupling.

10. The security strip of claim 9, wherein encoding means may be affected physically or chemically.

11. The security strip of claim 10, wherein the encoding means react as security element in the security strips (1) and/or in conjunction with the sheet material (2) by application of energy, especially visible light, UV, IR or heat radiation.

12. The security strip of claim 11, wherein the encoding means consist of components of a reaction dye and that they react only by contact of the components.

13. The security strip of claim 12, wherein the primers (11) are applied sectionally or surface-modulatingly.

14. The security strip of claim 13, wherein the electrically conductive polymer (12) is a polyethylene dioxythiophene polystyrene sulfonate (PEDT/PSS).

15. A security strip (1) for identifying the genuineness of sheet material (2), comprising a plurality of partial strips (30, 31), each of these partial strips (30, 31) consisting of a substrate (10), at least one of an integral or scattered metalized layer (13) of a predetermined first surface resistance and a sectionally or surface-modulatingly applied electrically conductive polymer (12) of a predetermined second defined surface resistance; the difference between the first and second surface resistance being greater than 100 kΩ/□; and the security strip (1) of connected from partial strips (30, 31) being integrated in sheet material.

16. The security strip of claim 15, wherein in their layer structure the partial strips (30, 31) are arranged such that they contain their own encoding means and that when connected with each other the partial strips (30, 31) contain different compound encoding means.

17. The security strip of claim 16, wherein encoding means, for instance the manufacturing place (20) or manufacturing data (21) are arranged by the number, arrangement and/or geometry of the substrate (10), the sectionally or surface-modulatingly applied electrically conductive polymer (12), the integral or scattered metalized layer (13) and the precision-fit compilation thereof into security strip (1).

18. The security strip of claim 17, wherein components of a reacting dye are contained in each of the partial strips (30, 31), said components reacting with each other after contact of the partial strips (30, 31) with each other.

19. The security strip of claim 18, wherein the security strip (1) and/or the partial strips (30, 31) contain encoding means arranged sectionally or surface-modulatingly or sectionally surface-modulatingly in different surface directions.

* * * * *

UNITED STATES PATENT AND TRADEMARK OFFICE

CERTIFICATE OF CORRECTION

PATENT NO. : 7,090,917 B2

APPLICATION NO. : 10/469652

DATED : August 15, 2006

INVENTOR(S) : Puttkammer

It is certified that error appears in the above-identified patent and that said Letters Patent is hereby corrected as shown below:

Replace lines 32-45 In column 8 with the following:

Column 8, claim should read --

15. A security strip (1) for identifying the genuineness of sheet material (2), comprising a plurality of partial strips (30, 31), each of these partial strips (30, 31) consisting of a substrate (10), at least one of an integral or scattered metalized layer (13) of a predetermined first surface resistance and a sectionally or surface-modulatingly applied electrically conductive polymer (12) of a predetermined second defined surface resistance; the difference between the first and second surface is resistance being greater than 100 kΩ/□; and that the security strip (1) of connected partial strips (30, 31) being integrated in sheet material, for instance documents, securities, banknotes. --

Signed and Sealed this

Fourteenth Day of November, 2006

JON W. DUDAS

*Director of the United States Patent and Trademark Office*